(12) United States Patent
Kroll et al.

(10) Patent No.: US 6,314,657 B2
(45) Date of Patent: Nov. 13, 2001

(54) APPARATUS AND METHOD FOR GAUGING THE RIDE HEIGHT OF A VEHICLE

(75) Inventors: William P. Kroll, Medina; Randie Evenson, Brooklyn Center, both of MN (US)

(73) Assignee: Intercomp Company, Minneapolis, MN (US)

( * ) Notice: Subject to any disclaimer, the term of this patent is extended or adjusted under 35 U.S.C. 154(b) by 0 days.

(21) Appl. No.: 09/780,272

(22) Filed: Feb. 9, 2001

Related U.S. Application Data

(63) Continuation of application No. 09/185,175, filed on Nov. 3, 1998, now abandoned.
(60) Provisional application No. 60/067,531, filed on Dec. 4, 1997.

(51) Int. Cl.[7] ..................................................... G01B 5/14
(52) U.S. Cl. ............................................. 33/783; 33/600
(58) Field of Search .................................. 33/203, 203.15, 33/288, 430, 600, 708, 783, 784, 810, 811, 812

(56) References Cited

U.S. PATENT DOCUMENTS

| | | | |
|---|---|---|---|
| 915,473 | * | 3/1909 | Petit ........................................ 33/810 |
| 1,245,213 | * | 11/1917 | Gammeter ............................... 33/203 |
| 2,367,872 | * | 1/1945 | Kamienski .............................. 33/810 |
| 4,612,656 | * | 9/1986 | Suzuki et al. ........................... 33/784 |
| 5,369,602 | * | 11/1994 | Naas et al. .............................. 33/600 |
| 5,465,501 | * | 11/1995 | Rogler .................................... 33/810 |
| 5,491,907 | * | 2/1996 | Vidmar ................................... 33/810 |
| 5,640,776 | * | 6/1997 | Krauss .............................. 33/203.15 |

OTHER PUBLICATIONS

"Stock Car Racing"; Jul. 1997; p.117.
"Racer Wholesale"; Oct. 31, 1997; p. 8.

* cited by examiner

*Primary Examiner*—G. Bradley Bennett
(74) *Attorney, Agent, or Firm*—Skinner & Associates

(57) ABSTRACT

A ride height gauge comprising a frame and an indicating mechanism. The frame preferably includes an upright and a generally horizontal base attached to the upright to form a right angle joint. The indicating mechanism preferably includes an arm, an arm mount, and an indicator device. The arm is attached to the arm mount, and the arm mount is slidably attached to the upright. The arm has a vertical position along the upright. The indicator device quantifies the vertical position of said arm. The indicator device may either be an analog device or a digital device. A method for using the ride height gauge to measure the ride height of an automobile chassis includes the steps of positioning the gauge directly under a corner of the chassis, sliding the arm upward until the arm contacts the chassis, and reading the quantified vertical position of the arm from the indicator device.

3 Claims, 5 Drawing Sheets

APPARATUS AND METHOD FOR GAUGING THE RIDE HEIGHT OF A VEHICLE

This application is a continuation of Application Ser. No. 09/185,175, filed Nov. 3, 1998, now abandoned, which claims the benefit under 35 U.S.C. 119(e) of provisional application Ser. No. 60/067,531, filed Dec. 4, 1997.

BACKGROUND OF THE INVENTION

1. Field of the Invention

The present invention relates, generally, to testing apparatus and methods. More particularly, the invention relates to testing apparatus for gauging the ride height of a vehicle. The invention is particularly useful for gauging the ride height of a racing automobile or other high performance vehicle.

2. Background Information

The height of a vehicle from the ground or roadway is important for cars in general and is especially important in high performance racing automobiles. The handling performance of the car can be optimized by accurately measuring the ride height. Accurate ride height measurements are used to detect sagging springs, to optimize wheel alignment, to improve the suspension and traction of the car, and to verify compliance with the ride height specifications for a particular racing class of automobiles. Generally, a lower ride height is preferred over a higher ride height because it results in a lower center of gravity. In racing classes of automobiles, for example, the ride height is lowered as close as possible to the minimum ride height allowed for a particular racing class. Additionally, the front ride height is preferably lower than the rear ride height.

A lower center of gravity and wider wheel base generally provides better handling characteristics by improving the overall traction of the car. Given two cars with wheel bases of equal width and different centers of gravity, the car with the lower center of gravity rolls less and generally feels much more controlled on the road than the car with the higher center of gravity. A car with a higher center of gravity will have a larger centrifugal or roll force during cornering, which causes more actual roll effect in the car and reduces overall traction. The outside tires of a car experiencing roll effect during cornering have increased traction while the inside tires have reduced traction. However, the entire traction for all of the tires is reduced because of the roll force. Therefore, in order to maximize the overall traction, it is desirable to minimize the roll effect on a car by lowering the ride height of the car. Most racing classes impose strict limitations on the minimum ride height for this reason.

The ride height of the vehicle also contributes to the wind venturi effect produced by the airstream flowing between the bottom of the car and the road surface. The underside of the car acts as a wing to create downward force on the car and increase traction. The wind venturi effect produces a greater downward force when the bottom of the car is closer to the road surface. Furthermore, the downward force is optimized when the wing formed by the underside of the car has an optimal angle of attack, as determined by an optimized front ride height that is lower than an optimized rear ride height. The only major limitation for lowering ride height to improve handling is that, sooner or later, the bottom of the car will rub against the road surface. The bottom of the car most likely will rub the road surface either when the car is traveling through fast sections of a track where the wind venturi effect produces the highest downward force levels or when the car suspension is compressed during cornering.

The state of the art generally includes various devices and methods for measuring ride height. Ride height is often gauged using a common measuring tape. Another known device for measuring ride height is an extruded aluminum block with steps on one side. The block is slid onto the frame rail of the car to measure the ride height. These methods are believed to have significant limitations and shortcomings. The tape is not easy to align and read. Rather than providing accurate, repeatable measurements, estimating the ride height using a measuring tape inherently introduces error factors that are too great for high performance racing cars. Similarly, the accuracy of the extruded aluminum block is limited by the increment of the steps, typically ⅛ inch or ¼ inch.

Applicants's invention provides an apparatus and method which are believed to provide improvements over existing technology.

BRIEF SUMMARY OF THE INVENTION

The present invention provides an apparatus and method for gauging the ride height of a vehicle. The ride height measurement apparatus or ride height gauge generally comprises a frame and an indicator mechanism. The frame is preferably L-shaped and includes a generally horizontal base attached to a generally vertical upright at a right-angle joint. The indicator mechanism includes a generally horizontal arm slidably attached to the upright through an arm mount. The indicator mechanism further includes an indicator device for quantifying the height of the arm above the base. The indicator device may be either an analog or digital measurement device.

The method for gauging the ride height of a vehicle generally comprises the steps of placing the ride height gauge beneath one corner of the frame of the vehicle, raising the arm until it contacts the frame, and reading the indicator device. These steps are repeated for each corner of the vehicle. An optional step includes locking the arm in place prior to the step of reading the indicator device.

Significant features of the invention include the ability to easily, quickly, accurately, and repeatably measure ride height. Thus, the present invention is particularly useful to make the required fine adjustments to optimize the handling of high performance racing automobiles.

The features, benefits and objects of this invention will become clear to those skilled in the art by reference to the following description, claims and drawings.

BRIEF DESCRIPTION OF THE SEVERAL VIEWS OF THE DRAWING

FIG. 1b is an end view of the ride height gauge of FIG. 1a.

DETAILED DESCRIPTION

Figure 1A:
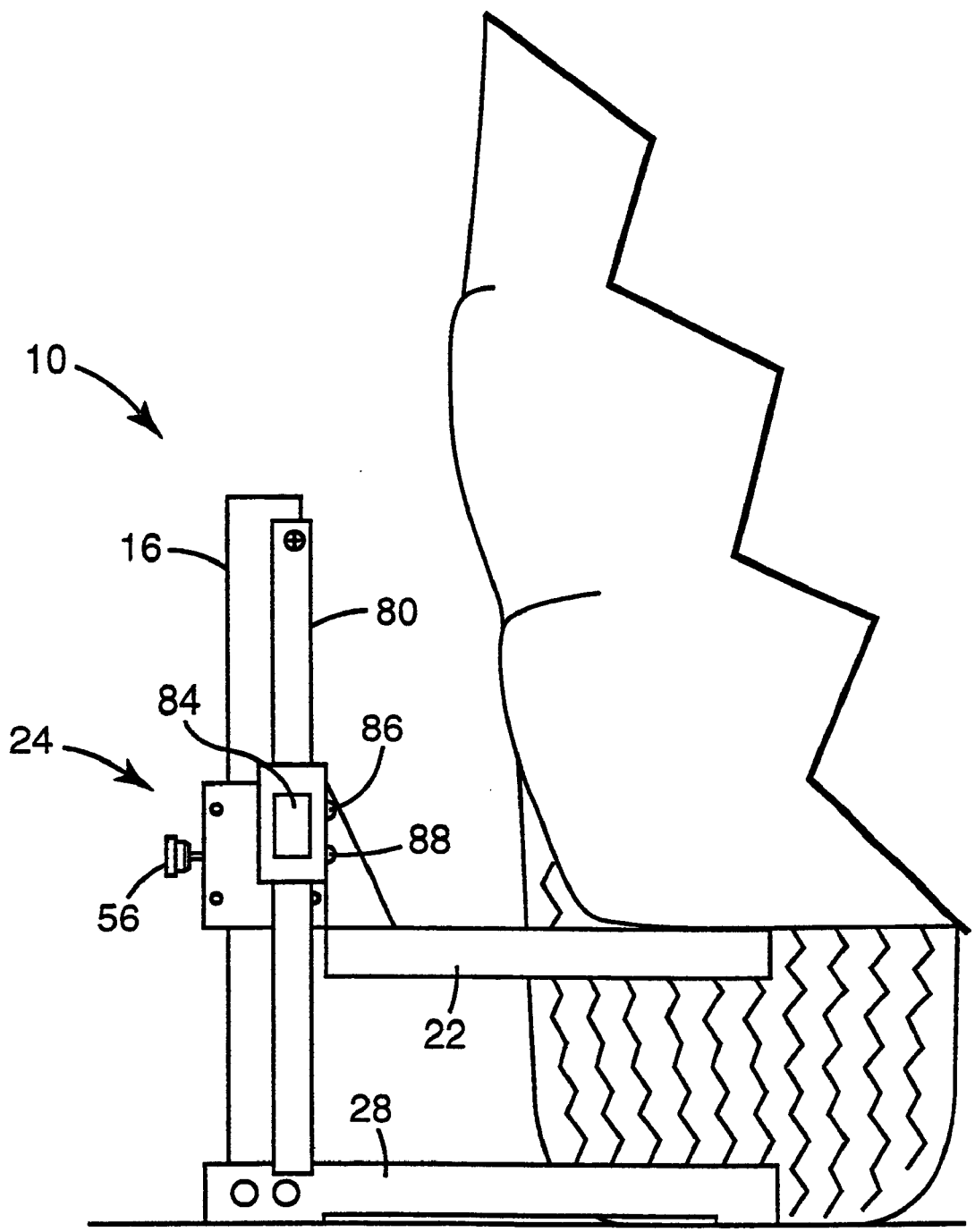
FIG. 1a is a side view of the ride height gauge of the present invention positioned underneath a vehicle.

Referring to FIGS. 1–6, examples of preferred embodiments of the present invention are illustrated and generally indicated by the reference numeral 10. The ride height gauge 10 is described below first in terms of its major structural elements and then in terms of its secondary structural and/or functional elements which cooperate to provide an apparatus that is used to easily, quickly, accurately, and repeatably measure ride height.

The ride height gauge 10 generally includes a frame 12 and an indicator mechanism 14. The indicator mechanism 14 quantifies the ride height of a car and includes an arm movably attached to the frame 12. The arm 22 is movable into contact with the frame of the car and the position of the arm 22 is quantified to indicate the ride height of the car. The frame 12 preferably is a L-shaped structure and includes a generally vertical upright 16 and a generally horizontal base 18 joined together at a right-angle joint 20. The arm 22 is preferably horizontal and is slidably attached to the vertical upright 16 of the frame 12 through an arm mount 24. However, it is anticipated that the arm 22 could be pivotally connected to the frame 12 or could be slid or screwed in and out of the frame 12. The indicator mechanism 14 further includes an indicator device 26 for quantifying the height of the arm 22 above the base 18 of the frame 12. As shown in the figures, the indicator device 26 may be either an digital indicator device 26a or a ruled or analog indicator device 26b. Dial indicators may be used to quantify the position of the arm 22 as well. The indicator device 26 is preferably a travel indicator which gauges the distance that the arm 22 slides on the upright 16. However, other indicator devices 26, such as those that would measure the angular displacement of a pivotally-attached arm, could be used for other ride height gauge designs.

Figure 1B:
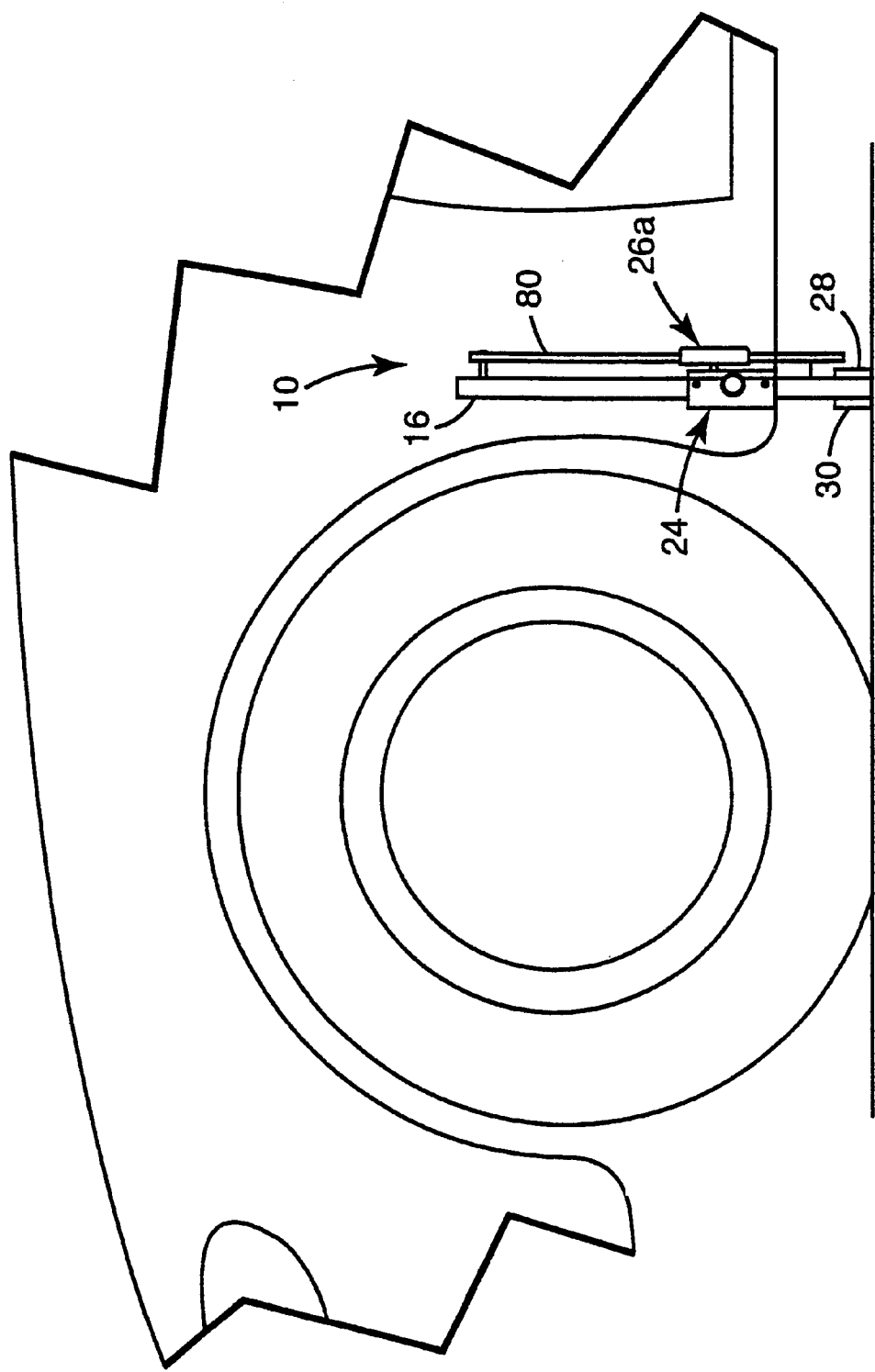

In general, the invention is used to measure ride height of a vehicle by placing the ride height gauge 10 underneath the frame of the vehicle, raising the arm 22 until it contacts the frame of the vehicle, and reading the measured ride height value from the indicator device 26. In the embodiments shown in the figures, the arm 22 may be locked in a predetermined position on the upright 16. FIGS. 1a and 1b illustrate the use of the ride height gauge 10 underneath a vehicle.

Figure 2:
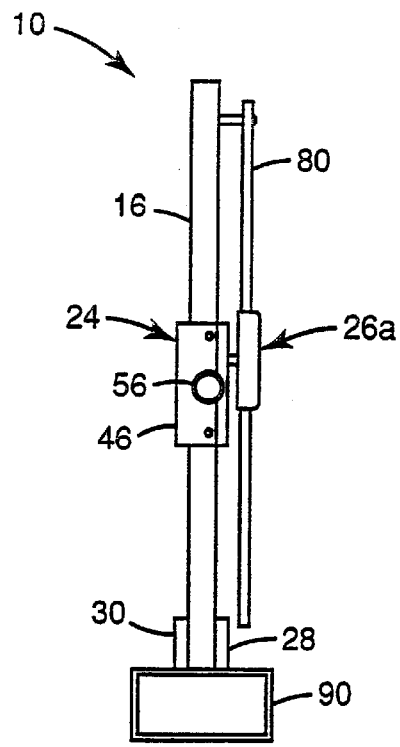
FIG. 2 is an end view of a digital ride height gauge.
Figure 3:
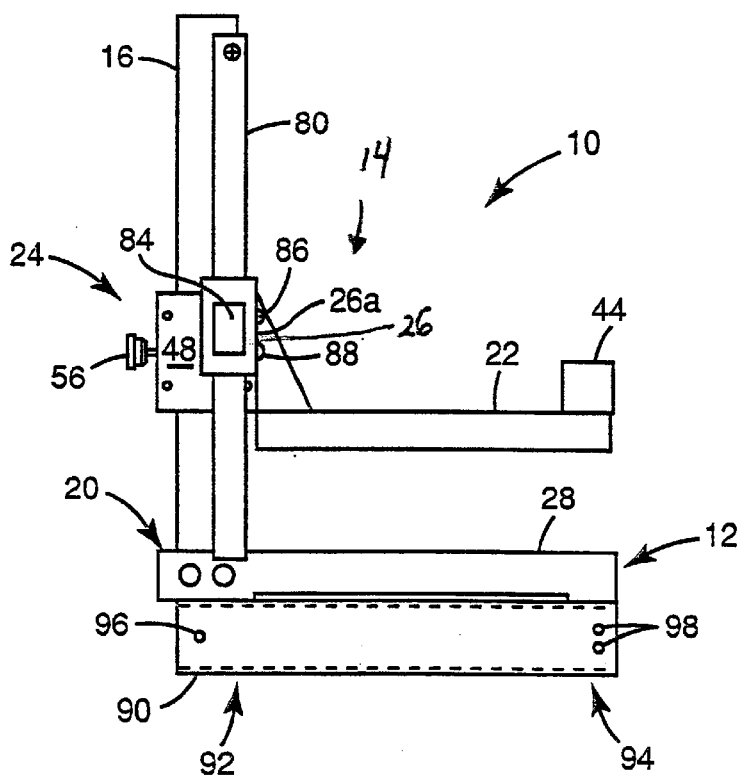
FIG. 3 is a side view the digital ride height gauge of FIG. 2.
Figure 4:
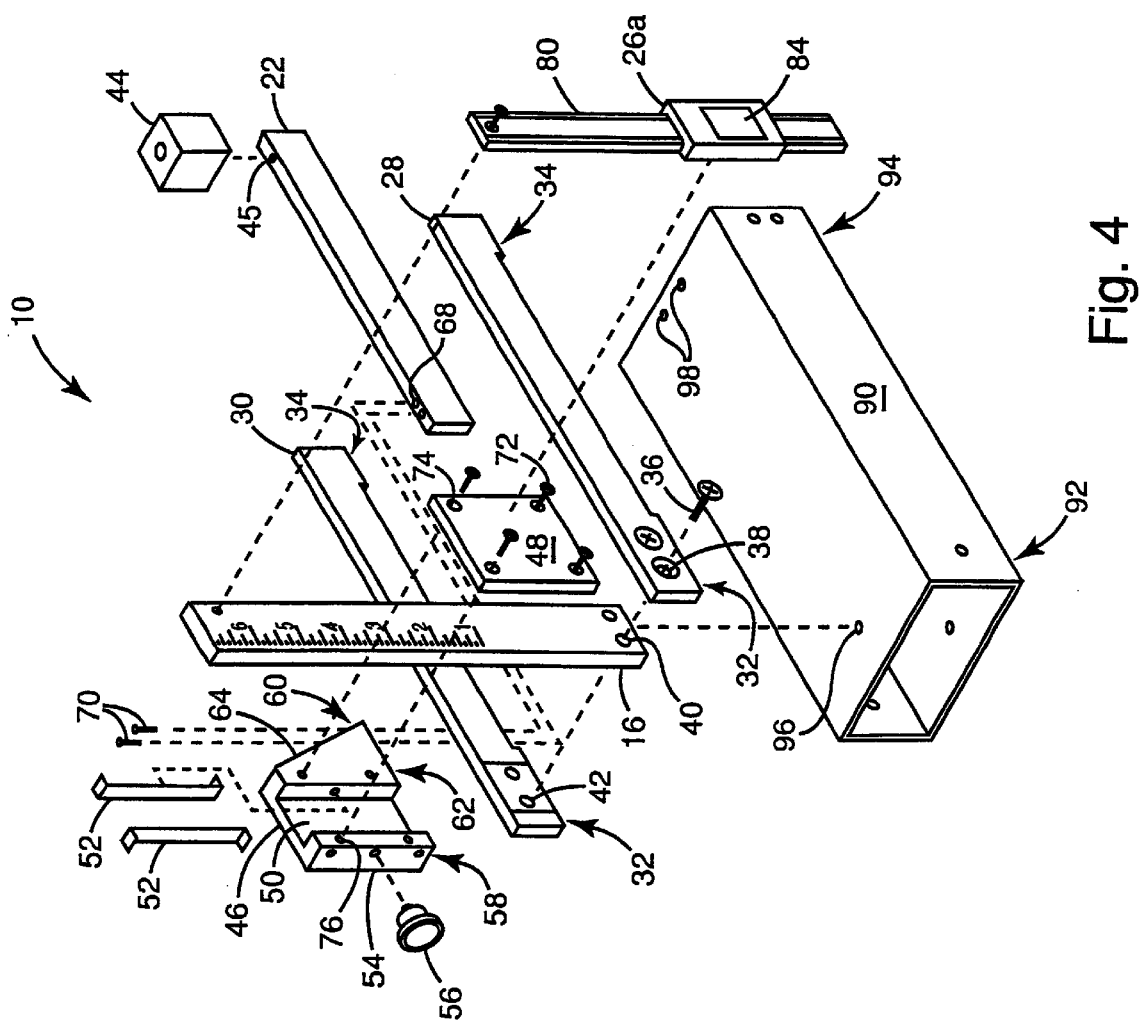
FIG. 4 is an exploded, perspective view of the digital ride height gauge of FIG. 2.

As shown in FIGS. 2 and 3, and more specifically in FIG. 4, the base 18 of the frame 12 preferably includes two parallel plates, a right base side 28 and a parallel left base side 30. Each of the sides 28 and 30 has a heel portion 32 and a toe portion 34 adapted to rest on a horizontal, planar surface such as a road surface or a block 90. The lower portion of the upright 16 is sandwiched in between the heel portion 32 of the right and left base sides 28 and 30. A pair of flat head screws 36 are screwed through joint apertures 38 in the right base side 28, through joint apertures 40 in the lower portion of the upright 16, and into threaded joint apertures 42 in the left base side 30. The two screws 36, along with recesses in the base sides 28 and 30, form a solid right-angle joint for the L-shaped frame 12.

The arm 22 of the preferred embodiment of the indicator mechanism 14 has a plate-like structure similar to the structure of the base sides 28 and 30. The arm 22 is mounted to the arm mount 24, which is movably and preferably slidably attached to the upright 16 of the frame 12. A removable block 44 may be screwed into a threaded aperture 45 positioned on the top side of the proximal end of the arm 22. The block 44 allows the ride height gauge 10 to be used to measure a car chassis that has an apron overhang or skirt.

The arm mount 24 of the indicator mechanism 14 generally comprises a guide block 46 and a cover plate 48. The guide block 46 has a proximal end 58 and an angled distal end 60. The proximal end 58 of the guide block 46 has a channel 50 sized to slidably receive the upright 16. The cover plate 48 is attached to the guide block 46 over the channel 50 to form a passage through which the upright 16 extends. A pair of shims 52 preferably line the two opposite walls within the channel 50 that bear the force associated with the weight of the arm 22. These shims 52 properly align or fit the upright 16 within the arm mount 24 and allow the arm mount 24 to smoothly slide up and down the upright 16. The guide block 46 further has a rear threaded aperture 54 through which a locking knob 56 can be turned into contact with the upright 16 to lock both the arm mount 24 and the arm 22 in a desired vertical position on the upright 16. The angled distal end 60 of the guide block 46 has a lower mounting surface 62 and an inclined surface 64. A pair of arm mount apertures extend from the inclined surface 64 through the mounting surface 62. A corresponding pair of threaded arm mount apertures 68 are positioned on the top surface of the arm 22. A pair of cap screws 70 are turned through the arm mount apertures and into the threaded apertures 68 to securely mount the arm 22 to the lower mounting surface 62 on the bottom of the guide block 46. The cover plate 48 is attached to the guide block 46 by turning flat head screws 72 through apertures 74 in the cover plate and into threaded apertures 76 in the guide block 46.

Figure 5:
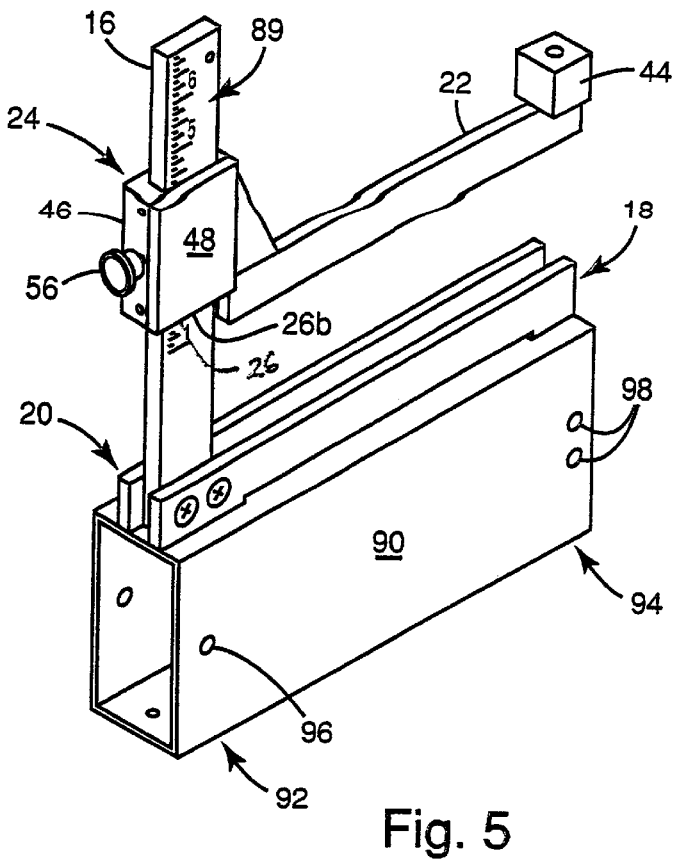
FIG. 5 is a perspective view of an analog ride height gauge mounted on a spacer block.
Figure 6:
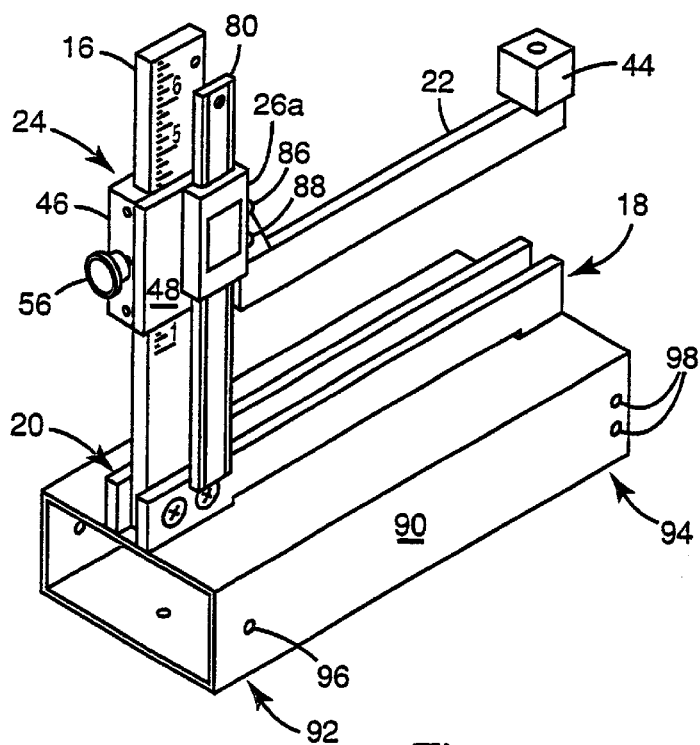
FIG. 6 is a perspective view of the digital ride height gauge of FIG. 2 mounted on a spacer block.

The indicator device 26 may be either a digital indicator device 26a as shown in the digital ride height gauge embodiment of FIGS. 2–4 and in FIG. 6 or an analog indicator device 26b as shown in the analog ride height gauge embodiment of FIG. 5. In the digital ride height gauge embodiment, a slide 80 is attached to the upright 16. A digital indicator device 26a slides over the slide 80 in such a manner as to allow the indicator device 26a to determine the vertical position of the device 26a. The digital indicator device 26a is preferably a magnetic digital travel indicator similar to those used in digital caliper designs. The digital indicator device 26a is directly attached to the arm mount 24. Vertical movement of the arm 22 results in vertical movement of the arm mount 24 and of the digital indicator device 26a. Thus the digital indicator device 26a can be calibrated to display the ride height of the vehicle by measuring the vertical position of the top surface of the arm 22. The digital indicator device 26a is capable of displaying the ride height with an accuracy of 0.0005 inches through a range of 0 to 9 inches. Additionally, the digital indicator device 26a can be set to measure the height in millimeters rather than in inches. The digital indicator device 26a has a display readout 84, a millimeter/inch button 86 for toggling between English and metric units, and a zero button 88 for setting or calibrating the initial position of the arm 22 to a height of 00.000 inches or millimeters. The digital indicator device 26b is preferably battery powered.

In the preferred analog ride height gauge embodiment, the analog indicator device 26a comprises the bottom edge of the arm mount 24 and ruled markings 89 on the upright 16. As seen in FIGS. 3 and 4, the top of the arm 22 is mounted to the bottom of the arm mount 24, resulting in the top of the arm 22 being aligned with the bottom of the arm mount 24. The bottom of the arm mount 24 is aligned with the ruled markings 89 to visually gauge the ride height. It is anticipated that a pointer may be positioned in a variety of places on the arm mount and that the ruled markings 89 on the upright 16 may be adjusted accordingly to provide accurate ride height measurements. The analog ride height gauge embodiment shown in FIG. 5 does not require the slide 80 that is incorporated in the digital ride height gauge embodiment.

The frame 12 of the ride height gauge 10 further may include a spacer block 90. The spacer block 90 permits the ride height gauge 10 to be used to measure vehicle frames 12 having a height greater than the range accommodated by the ride height gauge 10. The range of the preferred embodiment is 0 to 9 inches. Ride heights greater than 9 inches can be measured using the spacer block 90. The spacer block 90 preferably is a substantially rectangular tubular member having a predetermined width and height. The spacer block 90 has a proximal end or heel end 92 and a distal end or toe end 94. Each of the four sides of the spacer block 90 has a heel aperture 96 positioned at the heel end 92 and a pair of toe apertures 98 positioned at the toe end 94. The heel aperture 96 and toe apertures 98 of each side correspond and are capable of alignment with a threaded heel aperture positioned on the bottom of the upright 16 and with threaded toe apertures positioned on the bottom of the toe portion 34 of both the right and left base sides 28 and 30. As illustrated in FIGS. 5 and 6, the upright 16 and base 18 of the ride height gauge 10 may be mounted on any side of the spacer block 90 by turning screws through the apertures 96 and 98 in the spacer block 90 and into the threaded apertures in the bottom of the base sides 28 and 30 and the upright 16.

The ride height gauge 10 is preferably manufactured using lightweight, rigid, and corrosion resistant material. A preferred material is 6061 aluminum, also known as aircraft grade aluminum. However, it is anticipated that other material may be used.

The method of using the digital ride height gauge preferably includes performing the following steps:

1. Press the millimeter/inch button 86 to determine whether the device will measure the ride height in either millimeters or inches.

2. Release the tension on the gauge by turning the locking knob 56 counterclockwise.

3. Press the zero button 88 to ensure that the display reads 00.000 inches or millimeters.

4. Position the gauge 10 on the ground directly under one corner of the frame.

5. Move the arm 22 upward until it comes into contact with the frame. The removable indicating block 44 may need to be added if the car has an apron overhang or skirt.

6. Lock the arm 22 in place by turning the locking knob 56 clockwise.

7. Remove the gauge 10 from beneath the car to read the display readout 84.

8. Record the measured ride height.

9. Repeat the prior steps for all four corners of the car.

The method of using the analog ride height gauge preferably includes performing the following steps:

1. Release the tension on the gauge by turning the locking knob 56 counterclockwise.

2. Position the gauge 10 on the ground directly under one corner of the frame.

3. Align the bottom edge of the arm mount 24 with the ruled markings 89 on the upright 16 to determine the initial height of the arm 22.

4. Move the arm 22 upward until it comes into contact with the frame. The removable indicating block 44 may need to be added if the car has an apron overhang or skirt.

5. Lock the arm 22 in place by turning the locking knob 56 clockwise.

6. Remove the gauge 10 from beneath the car to read the ride height by aligning the bottom edge of the arm mount 24 with the ruled markings 89 on the upright 16.

7. Record the measured ride height.

8. Repeat the prior steps for all four corners of the car.

It is not necessary to lock the arm 22 in place using the locking knob 56 in order to obtain accurate ride height measurements. The measurement may be read when the arm has been moved into contact with the frame of the car. Therefore, steps 2 and 6 in the method of using the digital ride height gauge and steps 1 and 5 in the method of using the analog ride height gauge are optional.

The descriptions above and the accompanying drawings should be interpreted in the illustrative and not the limited sense. While the invention has been disclosed in connection with the preferred embodiment or embodiments thereof, it should be understood that there may be other embodiments which fall within the scope of the invention as defined by the following claims. Where a claim, if any, is expressed as a means or step for performing a specified function it is intended that such claim be construed to cover the corresponding structure, material, or acts described in the specification and equivalents thereof including both structural equivalents and equivalent structures, material-based equivalents and equivalent materials, and act-based equivalents and equivalent acts.

What is claimed is:

1. A ride height gauge for accurately and repeatably measuring the chassis ride height of an automobile of the type having a skirt around it's chassis, comprising:

(a) a frame adapted for standing proximate to an automobile chassis, said frame including an upright and a generally horizontal base attached to said upright to form a right angle joint; and (b) an indicating mechanism including:

(i) a horizontally oriented arm having a proximal end and a distal end;

(ii) a block having a predetermined height, said block being disposed at said distal end of said arm and oriented upwardly therefrom for contact with said automobile chassis, whereby said block permits said arm to avoid contact with the automobile chassis skirt;

(iii) an arm mount, said proximal end of said arm being attached to said arm mount, said arm mount being slidably attached to said upright to enable said block of said arm to move into contact with said automobile chassis, said arm having a vertical position along said upright, said arm mount including a guide block and a cover plate, said guide block having a proximal end and a distal end, said proximal end having a channel sized to slidably receive said upright, said cover plate being attached to said guide block and covering said channel; and (iv) a digital indicator device quantifying said vertical position of said arm, said upright having an attached slide, said digital indicator device cooperating with and sliding over said slide in a measured fashion, said digital indicator device being attached to said arm mount and quantifying said vertical position of said arm with respect to said frame to accurately and repeatably measure said automobile chassis' ride height.

2. A method for accurately and repeatably measuring an automobile chassis' ride height using a ride height gauge, said ride height gauge having a frame adapted for standing proximate to an automobile chassis and an indicating mechanism, said frame including an upright, said indicating mechanism including an arm, an arm mount, and a digital indicator device, said arm being attached to said arm mount, said arm mount being slidably attached to said upright, said arm having a vertical position along said upright, said arm mount having a locking knob for locking said arm mount at a vertical position on said upright, said digital indicator device quantifying said vertical position of said arm with respect to said frame to accurately and repeatably measure said automobile chassis' ride height, said digital indicator device having a zero button, said method comprising the steps of:

(a) loosening said locking knob;

(b) pressing said zero button to reset said digital indicator device;

(c) positioning said gauge directly under a corner of said chassis;

(d) sliding said arm upward until said arm contacts said chassis;

(e) tightening said locking knob;

(f) removing the gauge from beneath said chassis; and (g) reading said quantified vertical position of said arm from said digital indicator device.

3. A method for accurately and repeatably measuring the ride height of an automobile of the type having a skirt around its chassis, using a ride height gauge, said ride height gauge having a frame adapted for standing proximate to an automobile chassis and an indicating mechanism, said frame including an upright, said indicating mechanism including an arm, an arm mount, and a digital indicator device, said arm being attached to said arm mount, said arm mount being slidably attached to said upright, said arm having a vertical position along said upright, said arm mount having a locking knob for locking said arm mount at a vertical position on said upright, said digital indicator device quantifying said vertical position of said arm with respect to said frame to accurately and repeatably measure said automobile chassis' ride height, said digital indicator device having a zero button, said method comprising the steps of:

(a) loosening said locking knob;

(b) pressing said zero button to reset said digital indicator device;

(c) positioning said gauge directly under a corner of said chassis;

(d) attaching a block of a predetermined height to the arm at a distal end of the arm so that the block extends upwardly from the arm;

(e) sliding said arm upward until said block contacts said chassis, whereby the arm does not contact the automobile skirt;

(f) tightening said locking knob;

(g) removing the gauge from beneath said chassis; and (h) reading said quantified vertical position of said arm from said digital indicator device.

* * * * *